(12) United States Patent
Baek et al.

(10) Patent No.: US 9,876,374 B2
(45) Date of Patent: Jan. 23, 2018

(54) DEVICE FOR CONTROLLING CHARGING VOLTAGE

(71) Applicant: SAMSUNG SDI CO., LTD., Yongin-si, Gyeonggi-do (KR)

(72) Inventors: Woon-Seong Baek, Yongin-si (KR); Kwan-Il Oh, Yongin-si (KR); Buang-Ho Park, Yongin-si (KR); Se-Jin Ji, Yongin-si (KR); Hyeon-Cheol Jeong, Yongin-si (KR); Sang-Kyou Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 290 days.

(21) Appl. No.: 14/741,398

(22) Filed: Jun. 16, 2015

(65) Prior Publication Data

US 2016/0261121 A1   Sep. 8, 2016

(30) Foreign Application Priority Data

Mar. 5, 2015   (KR) .................. 10-2015-0031065

(51) Int. Cl.
*H02J 7/00*   (2006.01)

(52) U.S. Cl.
CPC ..... *H02J 7/0052* (2013.01); *H02J 2007/0059* (2013.01)

(58) Field of Classification Search
USPC ....................................................... 320/107
See application file for complete search history.

(56) References Cited

U.S. PATENT DOCUMENTS 8,595,122 B2 * 11/2013  Kamer ................ B60L 11/1848
                                                  320/109
2011/0156655 A1 *  6/2011  Kim .................... H01M 10/441
                                                  320/134
2014/0139176 A1    5/2014  Ji
2014/0306654 A1 * 10/2014  Partovi ................... H02J 7/025
                                                  320/108

FOREIGN PATENT DOCUMENTS

KR       1999-0030995 U     7/1999
KR       2003-0095387 A    12/2003
KR         20-0451276 Y1   12/2010
KR      10-2014-0065951 A   5/2014

* cited by examiner

*Primary Examiner* — Robert Grant
(74) *Attorney, Agent, or Firm* — Lewis Roca Rothgerber Christie LLP (57) ABSTRACT

A device for controlling a charging voltage, includes: a voltage drop unit configured to drop a voltage by a preset magnitude; a voltage comparison unit configured to compare a charging voltage of a battery with a first reference voltage and to output a path selection signal through an output terminal; a first path configured to connect the battery to a charging power supply; a second path configured to connect the battery to the charging power supply, with the voltage drop unit being interposed between the battery and the charging power supply; and a path selector configured to select one from the first path and the second path according to the path selection signal.

14 Claims, 5 Drawing Sheets

DEVICE FOR CONTROLLING CHARGING VOLTAGE

CROSS-REFERENCE TO RELATED APPLICATION

This application claims priority to and the benefit of Korean Patent Application No. 10-2015-0031065, filed in the Korean Intellectual Property Office on Mar. 5, 2015, the entire content of which is incorporated herein by reference.

BACKGROUND

1. Field

Example embodiments of the present invention relate to a device for controlling a charging voltage.

2. Description of the Related Art

Chargers for lithium ion batteries (LIBs) and chargers for lead acid batteries may have different sizes and/or characteristics.

In general, chargers for lead acid batteries are operated at DC 60 V/20 A. However, in general, the maximum charging voltage of LIBs is 57 V.

Accordingly, when a charger designed for a lead acid battery is used to charge a lithium ion battery, overcharging may occur.

The above information disclosed in this Background section is only for enhancement of understanding of the background of the invention and therefore it may contain information that does not constitute prior art.

SUMMARY

Example embodiments of the present invention are directed toward a device for controlling a charging voltage, and aspects of embodiments of the present invention include a device for controlling a charging voltage that is interposed when a charger having a different size is used.

According to aspects of embodiments of the present invention, a device for controlling a charging voltage may prevent or reduce instances of overcharge when a battery is charged by a charger having a size and/or configuration that is different from a charger designed to be used with the battery.

According to some example embodiments of the present invention, a device for controlling a charging voltage includes: a voltage drop unit configured to drop a voltage by a preset magnitude; a voltage comparison unit configured to compare a charging voltage of a battery with a first reference voltage and to output a path selection signal through an output terminal; a first path configured to connect the battery to a charging power supply; a second path configured to connect the battery to the charging power supply, with the voltage drop unit being interposed between the battery and the charging power supply; and a path selector configured to select one from the first path and the second path according to the path selection signal.

The path selection signal may include one of a first voltage and a second voltage, and the path selector may be configured to select the first path when the path selection signal is the first voltage, and to select the second path when the path selection signal is the second voltage.

The path selector may include: a first division resistor including a first electrode terminal connected to a third reference voltage; a third transistor including a control terminal connected to an output terminal of the voltage comparison unit, a first electrode terminal connected to a first node, and a second electrode terminal connected to another electrode terminal of the first division resistor; and a fourth transistor including a control terminal connected to the first node, a first electrode terminal connected to the charging power supply, and a second electrode terminal connected to the battery, wherein the control terminal and the first electrode terminal of the fourth transistor are connected to a second division resistor, and the third transistor is configured to be turned on when the first voltage is input to a control terminal of the third transistor.

The first path may be electrically formed by turning on the fourth transistor, and the second path may be electrically formed by turning off the fourth transistor.

The voltage comparison unit may include: a voltage comparator configured to receive the charging voltage and the first reference voltage, to output a third voltage when the charging voltage is lower than the first reference voltage, and to output a fourth voltage when the charging voltage is greater than the first reference voltage; a first transistor including a control terminal connected to an output terminal of the voltage comparator, a first electrode terminal connected to the charging voltage, and a second electrode terminal connected to an output terminal of the voltage comparison unit; and a second transistor including a control terminal connected to the output terminal of the voltage comparator, a first electrode terminal connected to a second reference voltage, and a second electrode terminal connected to the output terminal of the voltage comparison unit.

The first reference voltage may be greater than the second reference voltage.

The first transistor may be configured to be turned on when a third voltage is applied to the control terminal of the first transistor to output a first voltage to the output terminal of the voltage comparison unit, and the second transistor may be configured to be turned on when a fourth voltage is applied to the control terminal of the second transistor, and to output a second voltage to the output terminal of the voltage comparison unit.

The charging voltage may be determined by dividing a real charging voltage of the battery.

The voltage drop unit may include a diode.

The voltage drop unit may include a buck converter.

The buck converter may be configured to receive a drive voltage only while a second voltage is output from the voltage comparison unit.

The battery may be one selected from a lead acid battery and a lithium ion battery.

The first path may connect the lead acid battery to the charging power supply, and the second path may connect the lithium ion battery to the charging power supply.

According to some embodiments of the present invention, in a method for controlling a charging voltage, the method includes: comparing via a voltage comparison unit a charging voltage of a battery with a first reference voltage and to output a path selection signal through an output terminal; and selecting via a path selector one from a first path and a second path according to the path selection signal, the first path being to connect the battery to a charging power supply, the second path being to connect the battery to the charging power supply with a voltage drop unit being interposed between the battery and the charging power supply, and the voltage drop unit being to drop the charging voltage by a preset magnitude.

According to some embodiments of the present invention, in a system for controlling a charging voltage, the system includes: means for comparing a charging voltage of a battery with a first reference voltage and to output a path selection signal through an output terminal; and means for selecting one from a first path and a second path according to the path selection signal, the first path being to connect the battery to a charging power supply, the second path being to connect the battery to the charging power supply with a voltage drop unit being interposed between the battery and the charging power supply, and the voltage drop unit being to drop the charging voltage by a preset magnitude.

According to some example embodiments of the present invention, a device for controlling a charging voltage may prevent or reduce instances of overcharging when a battery is charged by a charger having a different size.

DETAILED DESCRIPTION

Hereinafter, example embodiments according to the present invention will be described in more detail with reference to the accompanying drawings. In the following description, if detailed description about well-known functions or configurations may make the subject matter of the disclosure unclear, the detailed description will be omitted. Like reference numerals designate like elements throughout the specification and the drawings.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein. Although embodiments are described with reference to a number of illustrative embodiments thereof, it should be understood that numerous other modifications and embodiments can be devised by those skilled in the art that will fall within the spirit and scope of the principles of the present invention. The terms "first" and "second" can be used to refer to various components, but the components may not be limited to the above terms. The terms will be used to discriminate one component from the other component.

The terminology used herein is for the purpose of describing particular embodiments only and is not intended to be limiting of the present invention. As used herein, the singular forms "a" and "an" are intended to include the plural forms as well, unless the context clearly indicates otherwise.

It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices, components, and units and/or any other relevant devices, components, and units according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Figure 1:
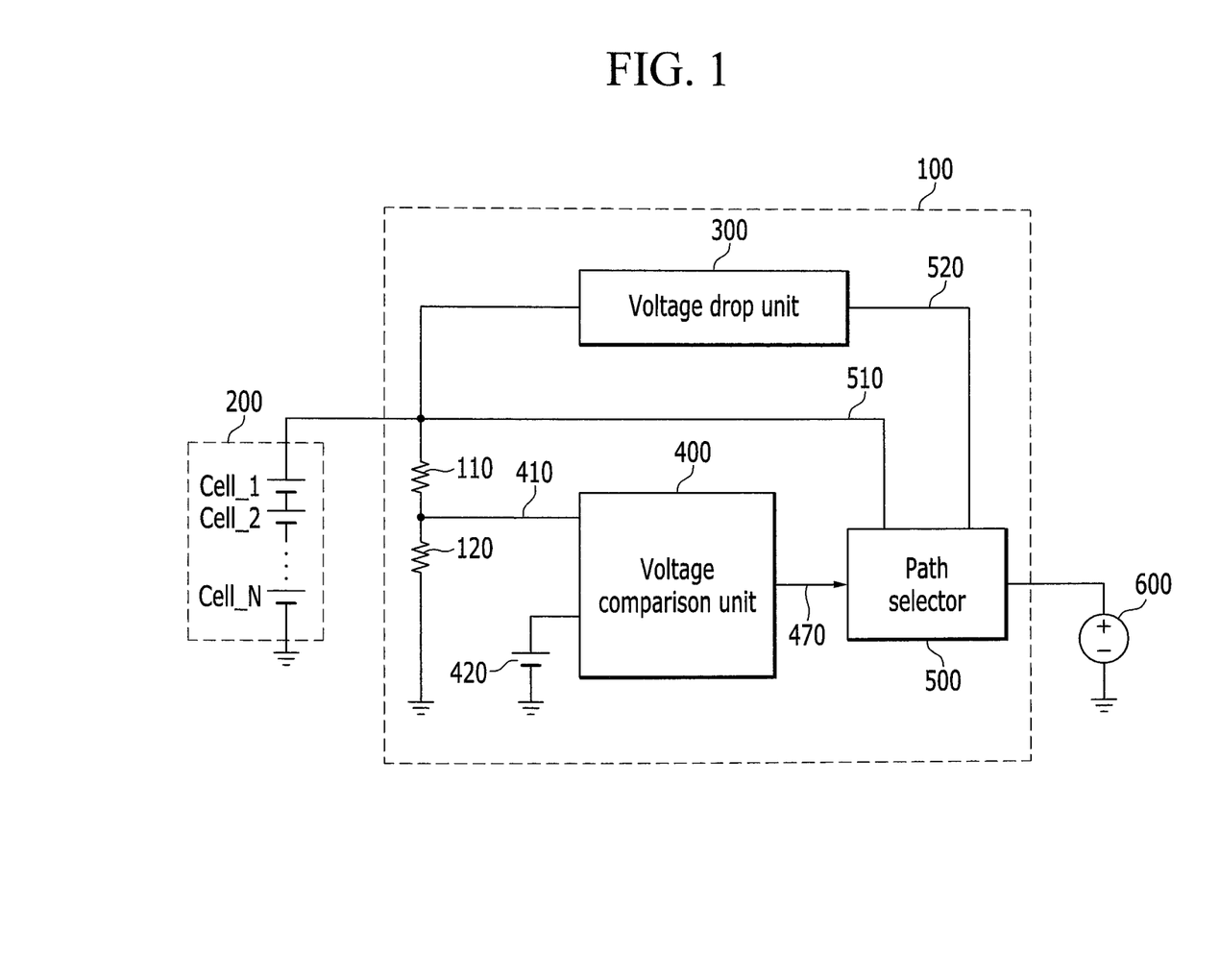
FIG. 1 is a circuit diagram illustrating a configuration of a device for controlling a charging voltage, according to some example embodiments of the present invention.

FIG. 1 is a circuit diagram illustrating a configuration of a device for controlling a charging voltage according to an example embodiment of the present invention.

Referring to FIG. 1, the device 100 for controlling a charging voltage according to an example embodiment of the present invention is electrically interposed (e.g., electrically connected) between a battery 200, operating as a charging target, and a charging power supply 600.

That is, the battery 200 is connected to (e.g., electrically connected to) the charging power supply 600 through the device 100 for controlling a charging voltage.

It will be understood that when a device is referred to as being "connected" to another device, it can be directly connected to the other device or intervening element(s) may be present in the present invention.

The other device may include an inductor, a capacitor, a resistor, a transistor, and/or the like. The other device may perform switching and filter functions according to a control signal.

A person having ordinary skill in the art should recognize that certain characteristics of the present invention may be achieved by interposing other devices between two devices without departing from the spirit and scope of the present invention.

Accordingly, the present invention includes embodiments in which two devices are directly connected to each other and embodiments in which two devices are electrically (or operationally) connected to each other by interposing additional devices or components between the two devices.

According to some example embodiments of the present invention, the charging power supply 600 may be designed to charge a different battery from that being charged (e.g., the charging power supply 600 may be designed to charge a battery other than the battery 200).

For example, the charging power supply 600 may be a charger for a lead acid battery, and may be operated at DC 60 V/20 A.

For example, the battery 200 may be a lithium ion battery (LIB), and a maximum charging voltage thereof may be 57 V. The battery 200 may be configured to include N battery cells. For example, according to some embodiments, the battery 200 may be configured to include 14 cells each having a maximum charging voltage of 4.05 V.

The device 100 for controlling a charging voltage may be electrically interposed (or electrically connected) between the battery 200 and the charging power supply 600 to prevent or reduce instances of overcharging of the battery 200.

Referring to FIG. 1, the device 100 for controlling a charging voltage according to an example embodiment of the present invention includes a voltage drop unit 300, a voltage comparison unit 400, a first path 510, a second path 520, and a path selector 500.

The voltage drop unit 300 may be configured to drop a voltage by a preset magnitude. As will be described later with respect to FIG. 2 and FIG. 3, the voltage drop unit 300 may include a diode or a buck converter.

The voltage of the preset magnitude which will be dropped by the voltage drop unit 300 may be determined or defined as a difference between a maximum voltage provided from the device 100 for controlling a charging voltage and a maximum voltage which the battery 200 may receive.

According to some embodiments, for example, the voltage drop unit 300 may be configured to drop a voltage by 3 V.

The voltage comparison unit 400 may be configured to receive and compare a charging voltage 410 of the battery 200 with a first reference voltage 420, and to output a path selection signal 470 through an output terminal according to the comparison result. The path selection signal 470 may include one of a first voltage and a second voltage.

The charging voltage 410 may include a real charging voltage of the battery 200.

As another example embodiment, the charging voltage 410 may be determined or calculated by dividing a real charging voltage of the battery 200. As shown in FIG. 1, the voltage division may be implemented using a ratio of a division resistor 110 to a division resistor 120.

For example, when the charger 200 includes 14 cells having a maximum charging voltage of 4.05 V, a resistance value of the division resistor 110 may be 13 kΩ, and a resistance value of the division resistor 120 may be 1 kΩ.

According to a configuration of the circuit, the charging voltage 410 may be variously designed to be differently divided.

The first reference voltage 420 may be determined such that it is the same as the charging voltage 410 when the battery 200 reaches the maximum charging voltage.

For example, when the charging voltage 410 when the battery 200 reaches a maximum charging voltage is 4.05 V, the first reference voltage 420 may be determined as 4.05 V.

As another example embodiment, the first reference voltage 420 may be determined to be lower than the charging voltage 410 when the battery 200 reaches the maximum charging voltage. In this case, a cycle-life of the battery 200 may be increased by preventing the battery 200 from being fully charged.

The first path 510 may be configured to connect the battery 200 to the charging power supply 600.

As described above, in the present invention, it will be understood that when an element is referred to as being "connected" to another element, it can be electrically connected to the other element or intervening element(s) may be present. Hereinafter, repetition of the above description is omitted.

The second path 520 electrically connects the battery 200 to the charging power supply 600.

However, the second path 520 is distinguished from the first path 510 by interposing the voltage drop unit 300 between the battery 200 and the charging power supply 600.

The path selector 500 is connected to an output terminal of the voltage comparison unit 400.

The path selector 500 may receive the path selection signal 470 from the output terminal of the voltage comparison unit 400.

When the path selection signal 470 is the first voltage, the path selector 500 may select the first path 510.

When the path selection signal 470 is the second voltage, the path selector 500 may select the second path 520.

An operation of a device for controlling a charging voltage of an example embodiment of FIG. 1 is as follows.

The voltage comparison unit 400 receives the charging voltage 410 and the first reference voltage 420. When the charging voltage 410 is lower than the first reference voltage 420, a constant current (CC) charging mode is operated.

In a case of the CC charging mode, the voltage comparison unit 400 outputs the path selection signal 470 as the first voltage to the output terminal.

The path selector 500 receives the first voltage and is switched to select the first path 510.

The charging power supply 600 is electrically connected to the battery 200, and the CC charging mode is operated.

There is a constant voltage (CV) charging mode different from the CC charging mode.

The voltage comparison unit 400 receives the charging voltage 410 and the first reference voltage 420. When the charging voltage 410 is higher than the first reference voltage 420, the CV charging mode is operated.

In a case of the CV charging mode, the voltage comparison unit 400 outputs the path selection signal being the second voltage to the output terminal.

The path selector 500 receives the second voltage and is switched to select the second path 520.

The charging power supply 600, the voltage drop unit 300, and the battery 200 are electrically connected to each other, and the CV charging mode is operated.

Because the voltage drop unit 300 drops a voltage by a preset magnitude, instances of overcharging of the battery 200 may be prevented or reduced.

Figure 2:
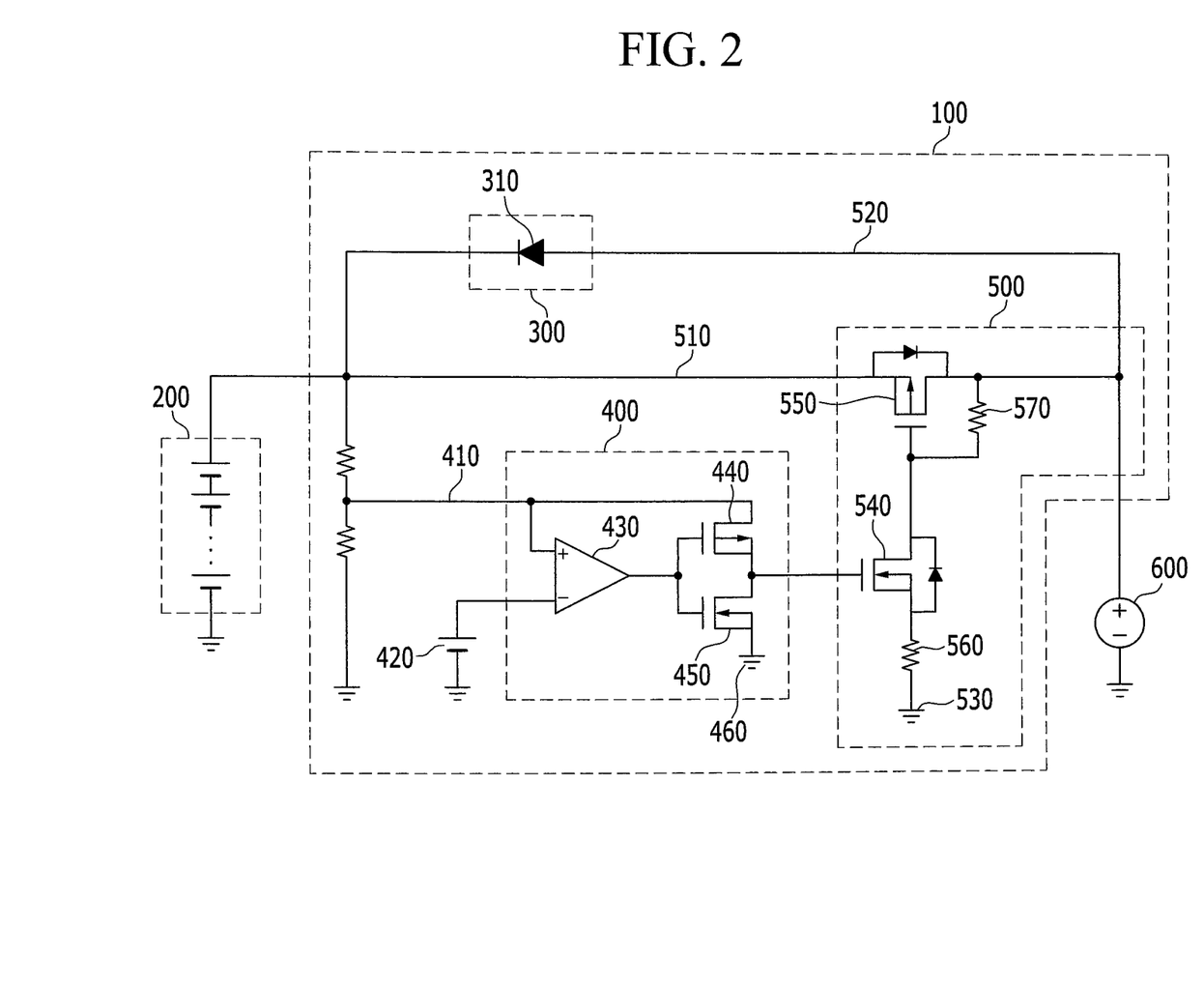
FIG. 2 is a circuit diagram illustrating a configuration of a device for controlling a charging voltage when a voltage drop unit is a diode, according to some example embodiments of the present invention.

FIG. 2 is a circuit diagram illustrating a configuration of a device for controlling a charging voltage when a voltage drop unit is a diode.

Referring to FIG. 2, the voltage comparison unit 400 includes a voltage comparator 430, a first transistor 440, and a second transistor 450.

The voltage comparator 430 receives the charging voltage 410 and the first reference voltage 420. When the charging voltage 410 is lower than the first reference voltage 420, the voltage comparator 430 outputs the third voltage. When the charging voltage 410 is higher than the first reference voltage 420, the voltage comparator 430 may output the fourth voltage.

The third voltage may be lower than the fourth voltage.

The voltage comparator 430 may include an operational amplifier (OPAMP).

A terminal to which the charging voltage 410 is input may be a non-inverting terminal (+) of the OPAMP, and a terminal to which the first reference voltage 420 is input may be an inverting terminal (−) of the OPAMP.

A control terminal of the first transistor 440 may be connected to an output terminal of the voltage comparator 430, one electrode terminal of the first transistor 440 may be connected to the charging voltage 410, and another electrode terminal of the first transistor 440 may be connected to an output terminal of the voltage comparison unit 400.

A control terminal of the second transistor 450 may be connected to the output terminal of the voltage comparator 430, one electrode terminal of the second transistor 450 may be connected to a second reference voltage 460, and another electrode terminal of the second transistor 450 may be connected to the output terminal of the voltage comparator 400.

In this case, the first transistor may be a P-channel metal oxide semiconductor (PMOS), and the second transistor may be an N-channel metal oxide semiconductor (NMOS), In the present invention, the configuration of the transistors (e.g., PMOS or NMOS) is illustrative only and may be variously modified according to the design. For example, when the voltage comparator 430 is an OPAMP, and receives an existing input voltage in a state that the inverting terminal (−) and a non-inverting terminal (+) are exchanged with each other, and the first transistor may be an NMOS and the second transistor may be a PMOS.

It should be understood to a person of ordinary skill in the art that various changes, variations, and modifications can be made to configurations of the transistors without departing from the spirit and scope of the embodiments of the present invention. Accordingly, some repetitive or redundant description of various modifications will be omitted.

When the third voltage is applied to a control terminal of the first transistor 440, the first transistor 440 is turned on to output the first voltage to the output terminal of the voltage comparator 400.

The first voltage may be the same as the charging voltage 410.

The first voltage may be a voltage of a magnitude to turn on a third transistor 540 to be described later. For example, because the third transistor 540 is the NMOS, the first voltage may be at a high level.

When the fourth voltage is applied to a control terminal of the second transistor 450, the second transistor 450 is turned on to output the second voltage to the output terminal of the voltage comparator 400.

The second voltage may have the same voltage as the second reference voltage 460.

The second voltage may be a voltage of a magnitude to turn off the third transistor 540. For example, because the third transistor 540 is the NMOS, the second voltage may be at a low level.

The first reference voltage 420 may be higher than the second reference voltage 460.

The second reference voltage 460 may be a ground voltage (GND).

Referring to FIG. 2, the path selector 500 includes a first division resistor 560, a second division resistor 570, a third transistor 540, and a fourth transistor 550.

One electrode terminal of the first division resistor 560 may be connected to one third reference voltage 530, and another electrode terminal of the first division resistor 560 may be connected to an electrode terminal of the third transistor 540.

The third reference voltage 530 may be the ground voltage.

A control terminal of the third transistor 540 may be connected to the output terminal of the voltage comparison unit 400, one electrode terminal of the third transistor 540 may be connected to a first node, and another electrode terminal of the third transistor 540 may be connected to an electrode terminal of the first division resistor 560.

The third transistor 540 may be an NMOS transistor.

When a first voltage is input to a control terminal of the third transistor 540, the third transistor 540 may be turned on.

A control terminal of the fourth transistor 550 may be connected to the first node, one electrode terminal of the fourth transistor 550 may be connected to the charging power supply 600, and another electrode terminal of the fourth transistor 550 may be connected to the battery 200.

The fourth transistor 550 may be the PMOS transistor.

One electrode terminal connected to the control terminal of the fourth transistor 550 and the charging power supply 600 may include or be connected to the second division resistor 570. That is, the division resistor 670 is connected at one end to the control terminal of the fourth transistor 550 and at another end to the charging power supply 600.

An operation of the path selector 500 is as follows.

In the CC charging mode, the first voltage output from the voltage comparison unit 400 is applied to the control terminal of the third transistor 540 to turn on the third transistor 540.

In this case, the first division resistor 560 and the second division resistor 570 divide a voltage of the charging power supply 60 in each resistor according to a resistance rate.

According to a voltage difference a cross the second division resistor 570, the fourth transistor 550 is turned on, and the first path 510 is electrically formed. That is, the charging power supply 600 supplies charging power to the battery 200 through the fourth transistor 550.

An operation of the path selector 500 in the CV charging mode is as follows.

In the CV charging mode, the second voltage output from the voltage comparator 400 is applied to a control terminal of the third transistor 540, and the third transistor 540 is turned off.

The control terminal of the fourth transistor 550 is in a floating state, and the fourth transistor 550 is turned off.

Accordingly, the second path 520 is electrically formed. That is, the charging power supply 600 supplies charging power to the battery 200 through the voltage drop unit 300.

Referring to FIG. 2, the voltage drop unit 300 includes a diode 310.

Because the second path 520 is electrically formed, if a forward voltage is applied to the diode 310, the diode 310 drops a voltage by a preset magnitude according to a characteristic of the diode 310 to transfer the charging power to the battery 200.

According to some embodiments, for example, the voltage of a preset magnitude may be 3 V.

Figure 3:
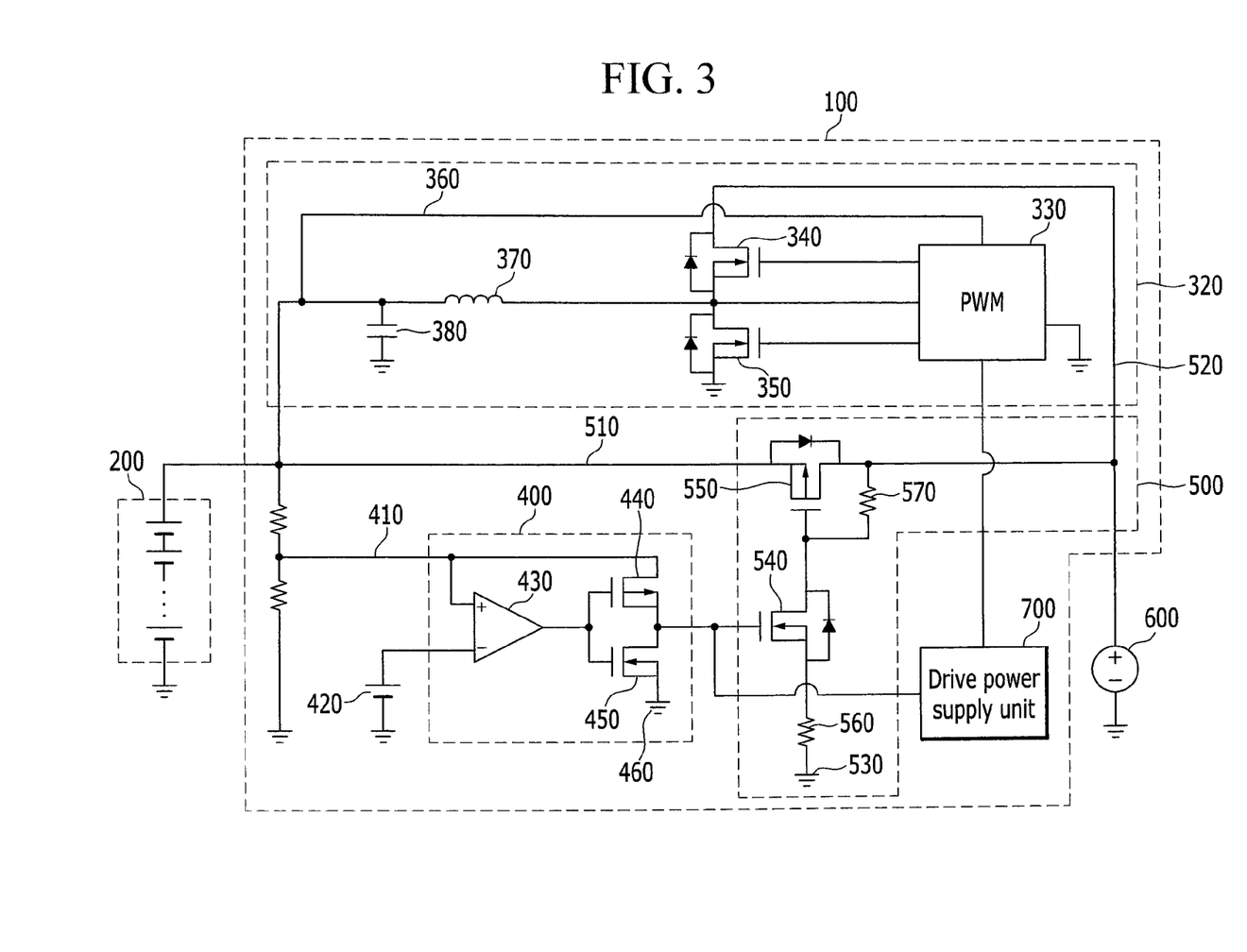
FIG. 3 is a circuit diagram illustrating a configuration of a device for controlling a charging voltage when a voltage drop unit is a buck converter, according to some example embodiments of the present invention.

FIG. 3 is a circuit diagram illustrating a configuration of a device for controlling a charging voltage when a voltage drop unit is a buck converter.

A structure where the first path 510 and the second path 520 are electrically formed is the same as that of the example embodiment of FIG. 2, and a detailed description thereof will be omitted.

When the second path 520 is formed, the charging power supply 600 is electrically connected to the battery 200 through a buck converter 320.

The buck converter 320 may include a drive voltage supply source.

As another example embodiment, referring to FIG. 3, the buck converter 320 may include a separate drive voltage supply unit 700 to supply a drive voltage when a second voltage is output from the voltage comparison unit.

When the voltage comparison unit 400 outputs the second voltage, the drive voltage supply unit 700 supplies a drive voltage to the buck converter 320. When the voltage comparison unit 400 outputs the first voltage, the drive voltage supply unit 700 may block a drive voltage which is supplied to the buck converter 320. The drive voltage supply unit 700 will be described in more detail in the example embodiment of FIG. 4.

The buck converter 320 may include any suitable buck converter configuration according to the related art. Accordingly, an operation of the buck converter 320 will be described below.

A pulse width modulator (PWM) 330 is controlled through a feedback line 360 connected to the output terminal of the buck converter 320.

The PWM 330 alternately turns a transistor 340 and a transistor 350 on and off.

If the transistor 340 is turned on and the transistor 350 is turned off, the charging power from the charging power supply 600 is supplied to the battery 200 through the transistor 340 and an inductor 370.

If the transistor 340 is turned off but the transistor 350 is turned on, connection between the charging power supply 600 and the buck converter 320 is blocked.

In this case, a current stored in the inductor 370 flows in an output direction of the buck converter 320.

Accordingly, the buck converter 320 may drop a voltage by a preset magnitude.

According to some embodiments, for example, the voltage of a preset magnitude may be 3 V.

Figure 4:
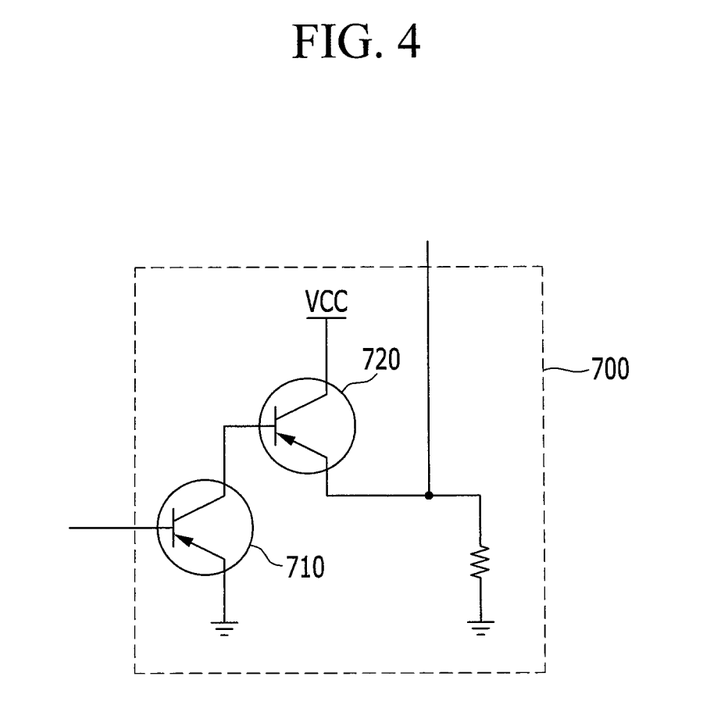
FIG. 4 is a circuit diagram illustrating an example of a drive voltage supply unit, according to some example embodiments of the present invention.

FIG. 4 is a circuit diagram illustrating an example of a drive voltage supply unit.

Referring to FIG. 4, the drive voltage supply unit 700 may include a PNP transistor 710, a PNP transistor 720, and a drive voltage VCC.

When the voltage comparison unit 400 outputs the second voltage, the drive voltage supply unit 700 may supply a drive voltage to the buck converter 320. When the voltage comparison unit 400 outputs the first voltage, the drive voltage supply unit 700 may block the drive voltage which is supplied to the buck converter 320.

The second voltage may have the same magnitude as that of the second reference voltage 460. The second voltage may be the ground voltage.

The second voltage is applied to a control terminal of the PNP transistor 710 so that the PNP transistor 710 is turned on.

Accordingly, a ground voltage is applied to the control terminal of the PNP transistor 720 through the PNP transistor 710 so that the PNP transistor 720 is also turned on.

In this case, the drive voltage VCC is applied to a PWM 330 of the buck converter 320 through the PNP transistor 720 so that the buck converter 320 is operated.

Figure 5:
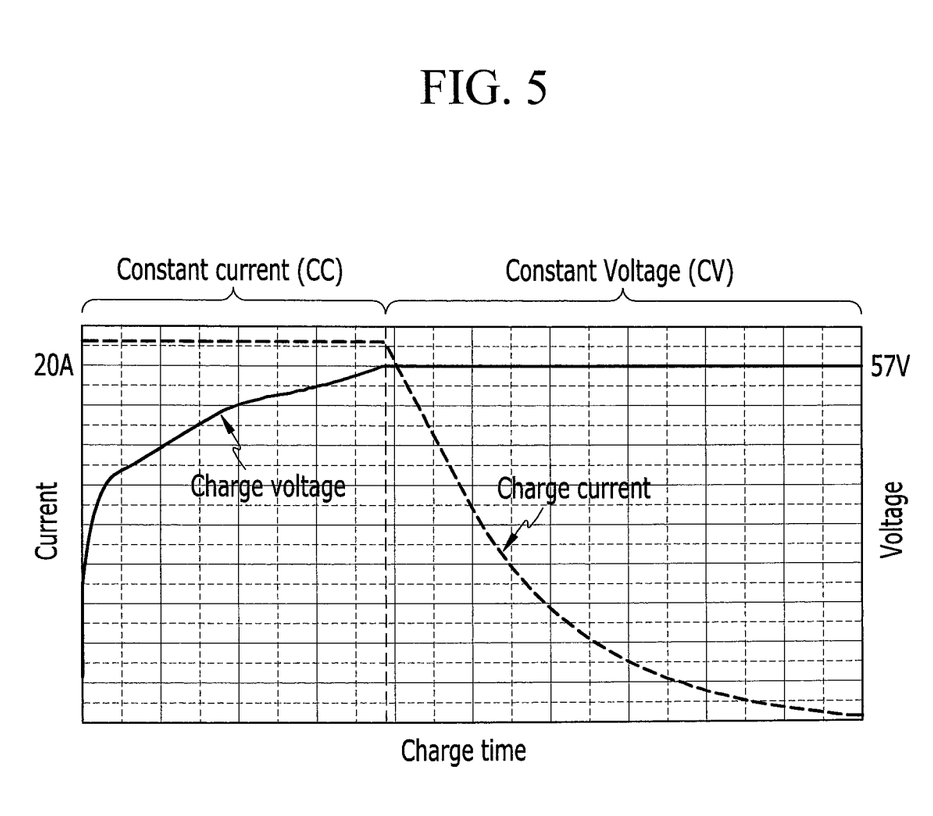
FIG. 5 is a voltage and current graph for when the device for controlling a charging voltage is used, according to some example embodiments of the present invention.

FIG. 5 is a voltage and current graph for when the device for controlling a charging voltage is used, according to an example embodiment of the present invention.

Referring to FIG. 5, when the battery 200 is not fully charged, the CC charging mode may be operated. When the battery 200 is fully charged, the CV charging mode may be operated.

The battery 200 may not be overcharged to greater than 57 V being a maximum voltage by interposing the device for controlling a charging voltage according to the present invention between the battery 200 and the charging power supply 600.

A detailed description of the accompanying drawings and the invention describe some features of example embodiments of the present invention, which are used for the purpose of describing the present invention, but are not used to limit the meanings or a range of the present invention described in claims, and their equivalents. Accordingly, those skilled in the art to which the invention pertains can easily select and substitute therefrom. Therefore, a substantial technical protective range of the present invention will be determined based on a technical idea of appended claims, and their equivalents.

DESCRIPTION OF SOME OF THE SYMBOLS

100: device for controlling a charging voltage
200: battery
300: voltage drop unit
310: diode
320: buck converter
400: voltage comparison unit
410: charging voltage
420: first reference voltage
430: voltage comparator
440: first transistor
450: second transistor
460: second reference voltage
470: path selection signal
500: path selector
510: first path
520: second path
530: third reference voltage
540: third transistor
550: fourth transistor
560: first division resistor
570: second division resistor
600: charging power supply
700: drive voltage supply unit

What is claimed is:
1. A device for controlling a charging voltage, the device comprising:
a voltage drop unit configured to drop a voltage by a preset magnitude;

a voltage comparison unit configured to compare a charging voltage of a battery with a first reference voltage and to output a path selection signal through an output terminal;
a first path configured to connect the battery to a charging power supply;
a second path configured to connect the battery to the charging power supply, with the voltage drop unit being interposed between the battery and the charging power supply; and
a path selector configured to select one from the first path and the second path according to the path selection signal,
wherein the voltage comparison unit comprises:
a voltage comparator configured to receive the charging voltage and the first reference voltage, to output a third voltage when the charging voltage is lower than the first reference voltage, and to output a fourth voltage when the charging voltage is greater than the first reference voltage;
a first transistor comprising a control terminal connected to an output terminal of the voltage comparator, a first electrode terminal connected to the charging voltage, and a second electrode terminal connected to an output terminal of the voltage comparison unit; and
a second transistor comprising a control terminal connected to the output terminal of the voltage comparator, a first electrode terminal connected to a second reference voltage, and a second electrode terminal connected to the output terminal of the voltage comparison unit.

2. The device of claim 1, wherein the path selection signal comprises one of a first voltage and a second voltage, and
the path selector is configured to select the first path when the path selection signal is the first voltage, and to select the second path when the path selection signal is the second voltage.

3. The device of claim 2, wherein
the path selector comprises:
a first division resistor comprising a first electrode terminal connected to a third reference voltage;
a third transistor comprising a control terminal connected to an output terminal of the voltage comparison unit, a first electrode terminal connected to a first node, and a second electrode terminal connected to another electrode terminal of the first division resistor; and
a fourth transistor comprising a control terminal connected to the first node, a first electrode terminal connected to the charging power supply, and a second electrode terminal connected to the battery,
wherein the control terminal and the first electrode terminal of the fourth transistor are connected to a second division resistor, and
the third transistor is configured to be turned on when the first voltage is input to a control terminal of the third transistor.

4. The device of claim 3, wherein the first path is electrically formed by turning on the fourth transistor, and the second path is electrically formed by turning off the fourth transistor.

5. The device of claim 1, wherein the first reference voltage is greater than the second reference voltage.

6. The device of claim 1, wherein the first transistor is configured to be turned on when a third voltage is applied to the control terminal of the first transistor to output a first voltage to the output terminal of the voltage comparison unit, and
the second transistor is configured to be turned on when a fourth voltage is applied to the control terminal of the second transistor, and to output a second voltage to the output terminal of the voltage comparison unit.

7. The device of claim 1, wherein the charging voltage is determined by dividing a real charging voltage of the battery.

8. The device of claim 1, wherein the voltage drop unit comprises a diode.

9. The device of claim 1, wherein the voltage drop unit comprises a buck converter.

10. The device of claim 9, wherein the buck converter is configured to receive a drive voltage only while a second voltage is output from the voltage comparison unit.

11. The device of claim 1, wherein the battery is one selected from a lead acid battery and a lithium ion battery.

12. The device of claim 11, wherein the first path is to connect the lead acid battery to the charging power supply, and the second path is to connect the lithium ion battery to the charging power supply.

13. A method for controlling a charging voltage, the method comprising:
comparing via a voltage comparison unit a charging voltage of a battery with a first reference voltage and to output a path selection signal through an output terminal; and
selecting via a path selector one from a first path and a second path according to the path selection signal,
the first path being to connect the battery to a charging power supply,
the second path being to connect the battery to the charging power supply with a voltage drop unit being interposed between the battery and the charging power supply, and
the voltage drop unit being to drop the charging voltage by a preset magnitude, wherein the voltage comparison unit comprises:
a voltage comparator configured to receive the charging voltage and the first reference voltage, to output a third voltage when the charging voltage is lower than the first reference voltage, and to output a fourth voltage when the charging voltage is greater than the first reference voltage;
a first transistor comprising a control terminal connected to an output terminal of the voltage comparator, a first electrode terminal connected to the charging voltage, and a second electrode terminal connected to an output terminal of the voltage comparison unit; and
a second transistor comprising a control terminal connected to the output terminal of the voltage comparator, a first electrode terminal connected to a second reference voltage, and a second electrode terminal connected to the output terminal of the voltage comparison unit.

14. A system for controlling a charging voltage, the system comprising:
means for comparing a charging voltage of a battery with a first reference voltage and to output a path selection signal through an output terminal; and
means for selecting one from a first path and a second path according to the path selection signal,
the first path being to connect the battery to a charging power supply,
the second path being to connect the battery to the charging power supply with a voltage drop unit being interposed between the battery and the charging power supply, and the voltage drop unit being to drop the charging voltage by a preset magnitude, wherein the means for comparing the charging voltage of the battery comprises:

a voltage comparator configured to receive the charging voltage and the first reference voltage, to output a third voltage when the charging voltage is lower than the first reference voltage, and to output a fourth voltage when the charging voltage is greater than the first reference voltage;

a first transistor comprising a control terminal connected to an output terminal of the voltage comparator, a first electrode terminal connected to the charging voltage, and a second electrode terminal connected to an output terminal of the means for comparing the charging voltage; and a second transistor comprising a control terminal connected to the output terminal of the voltage comparator, a first electrode terminal connected to a second reference voltage, and a second electrode terminal connected to the output terminal of the means for comparing the charging voltage.

* * * * *